United States Patent
Li

(10) Patent No.: US 11,366,932 B2
(45) Date of Patent: Jun. 21, 2022

(54) CONSENSUS METHOD AND DATA VERIFICATION METHOD, APPARATUS, AND SYSTEM OF CONSORTIUM BLOCKCHAIN

(71) Applicant: Alipay (Hangzhou) Information Technology Co., Ltd., Zhejiang (CN)

(72) Inventor: Shuai Li, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/352,687

(22) Filed: Jun. 21, 2021

(65) Prior Publication Data

US 2022/0004665 A1   Jan. 6, 2022

(30) Foreign Application Priority Data

Jul. 3, 2020   (CN) .......................... 202010630324.9

(51) Int. Cl.
*G06F 21/64*   (2013.01)
*G06F 16/23*   (2019.01)
*H04L 9/32*   (2006.01)

(52) U.S. Cl.
CPC .......... *G06F 21/64* (2013.01); *G06F 16/2365* (2019.01); *G06F 16/2379* (2019.01);
(Continued)

(58) Field of Classification Search
CPC .. G06F 21/64; G06F 16/2365; G06F 16/2379; G06F 11/10; G06F 11/1448;
(Continued)

(56) References Cited

U.S. PATENT DOCUMENTS 10,693,994 B2 *   6/2020  Chen .................... H04L 9/0637
10,803,052 B2 *  10/2020  Yang .................. G06F 11/0709
(Continued)

FOREIGN PATENT DOCUMENTS

CN   108848056 A   11/2018
CN   110798308 A    2/2020
(Continued)

OTHER PUBLICATIONS

First Office Action of Chinese Application No. 202010630324.9, dated Aug. 19, 2020.
(Continued)

*Primary Examiner* — Christopher A Revak
(74) *Attorney, Agent, or Firm* — Finnegan, Henderson, Farabow, Garrett & Dunner, LLP

(57) ABSTRACT

A consensus method includes: when a first consensus node of a consortium blockchain performs a consensus operation on a consensus proposal, sending a verification signature to a second consensus node of the consortium blockchain, wherein the verification signature is configured to represent at least one consensus verification item set by the first consensus node sending the verification signature for the consensus proposal; receiving, by the first consensus node, a verification signature sent by at least one of the second consensus node or a third consensus node of the consortium blockchain for the consensus proposal; and after the first consensus node reaches a consensus on proposal data of the consensus proposal, generating a block recording the received verification signature corresponding to the consensus proposal and the proposal data, wherein the verification signature recorded in the block is configured to prove validity of the proposal data recorded in the block.

13 Claims, 6 Drawing Sheets

(52) U.S. Cl.
    CPC .......... *H04L 9/3239* (2013.01); *H04L 9/3247* (2013.01); *H04L 9/3297* (2013.01)

(58) Field of Classification Search
    CPC ... H04L 9/3239; H04L 9/3247; H04L 9/3297; H04L 63/123; H04L 2209/38; G06Q 20/3825; G06Q 20/3827; G06Q 20/3829; G06Q 20/4016; G06Q 40/04
    See application file for complete search history.

(56) References Cited

U.S. PATENT DOCUMENTS

2019/0251077 A1    8/2019  Yang
2021/0109825 A1*   4/2021  Liao .......................... H04L 9/14

FOREIGN PATENT DOCUMENTS

| CN | 110875893 A | 3/2020 |
| CN | 111224782 A | 6/2020 |

OTHER PUBLICATIONS

Extended European Search Report in European Application No. 21180768.0, dated Nov. 12, 2021.

* cited by examiner

```
┌─────────────────────────────────────────────────────────────┐
│ When performing a consensus operation on a target consensus │
│ proposal, a target consensus node of a consortium           │
│ blockchain sends a verification signature to another        │──S102
│ consensus node of the consortium blockchain, wherein the    │
│ verification signature is configured to represent at least  │
│ one consensus verification item set by the consensus node   │
│ sending the verification signature for the target consensus │
│ proposal                                                    │
└─────────────────────────────────────────────────────────────┘
                              │
                              ▼
┌─────────────────────────────────────────────────────────────┐
│ The target consensus node receives a verification signature │──S104
│ sent by another consensus node of the consortium blockchain │
│ for the target consensus proposal                           │
└─────────────────────────────────────────────────────────────┘
                              │
                              ▼
┌─────────────────────────────────────────────────────────────┐
│ After a consensus is reached on proposal data of the target │
│ consensus, the target consensus node generates a block      │──S106
│ recording a collected verification signature corresponding  │
│ to the target consensus and the proposal data, wherein the  │
│ verification signature recorded in the block is configured  │
│ to prove the validity of the proposal data recorded in the  │
│ block                                                       │
└─────────────────────────────────────────────────────────────┘
```

FIG. 1

CONSENSUS METHOD AND DATA VERIFICATION METHOD, APPARATUS, AND SYSTEM OF CONSORTIUM BLOCKCHAIN

CROSS-REFERENCE TO RELATED APPLICATIONS

The present application is based upon and claims priority to Chinese Patent Application No. 202010630324.9, filed on Jul. 3, 2020, the entire content of which is incorporated herein by reference.

TECHNICAL FIELD

The present application relates to the field of consortium blockchain technologies, and in particular, to a consensus method and a data verification method, apparatus, and system of a consortium blockchain.

BACKGROUND

A consortium blockchain is a kind of blockchain applied between institutions, and various nodes thereof usually have corresponding entities, such as banking, insurance, security, and business associations. These institutions form an interests-related consortium to jointly maintain operation of the blockchain. In the prior art, a consensus on the consortium blockchain needs to be reached on data before the data can be recorded by a new block generated by each node.

At present, when validity of block data of a certain node is verified, it is necessary to compare the block data with block data correspondingly stored by another node. This method is relatively cumbersome and time-consuming in data tracing, and therefore, how to improve the convenience of block data verification is a technical problem that needs to be solved urgently.

SUMMARY

In a first aspect, a consensus method of a consortium blockchain is provided, including: when a first consensus node of the consortium blockchain performs a consensus operation on a consensus proposal, sending a verification signature to a second consensus node of the consortium blockchain, wherein the verification signature is configured to represent at least one consensus verification item set by the first consensus node sending the verification signature for the consensus proposal; receiving, by the first consensus node, a verification signature sent by at least one of the second consensus node or a third consensus node of the consortium blockchain for the consensus proposal; and after the first consensus node reaches a consensus on proposal data of the consensus proposal, generating a block recording the received verification signature corresponding to the consensus proposal and the proposal data, wherein the verification signature recorded in the block is configured to prove validity of the proposal data recorded in the block.

In a second aspect, a data verification method of a consortium blockchain is provided, including: extracting, from a block of a first consensus node of a consortium blockchain, recorded proposal data and a verification signature from at least one consensus node in the consortium blockchain, wherein the proposal data in the block is from a consensus proposal, and the verification signature is configured to represent at least one consensus verification item set by the at least one consensus node sending the verification signature for the consensus proposal; and verifying validity of the proposal data recorded in the block based on a quantity of verification signatures extracted from the block.

In a third aspect, a first consensus node of a consortium blockchain is provided, including: a processor; and a memory storing instructions executable by the processor, wherein the processor is configured to: when a consensus operation is performed on a consensus proposal, send a verification signature to a second consensus node of the consortium blockchain, wherein the verification signature is configured to represent at least one consensus verification item set by the first consensus node sending the verification signature for the consensus proposal; receive a verification signature sent by at least one of the second consensus node or a third consensus node of the consortium blockchain for the consensus proposal; and after a consensus is reached on proposal data of the consensus proposal, generate a block recording the received verification signature corresponding to the consensus proposal and the proposal data, wherein the verification signature recorded in the block is configured to prove validity of the proposal data recorded in the block.

In a fourth aspect, a data verification apparatus of a consortium blockchain is provided, including: a processor; and a memory storing instructions executable by the processor, wherein the processor is configured to: extract, from a block of a first consensus node of a consortium blockchain, recorded proposal data and a verification signature from at least one consensus node in the consortium blockchain, wherein the proposal data in the block is from a consensus proposal, and the verification signature is configured to represent at least one consensus verification item set by the at least one consensus node sending the verification signature for the consensus proposal; and verify validity of the proposal data recorded in the block based on a quantity of verification signatures extracted from the block.

Based on the embodiments of the present specification, when performing a consensus operation on a consensus, if proposal data meets a consensus verification item set by a consensus node of a consortium blockchain itself for the consensus proposal, a verification signature is sent to another consensus node. After a consensus is reached on the proposal data, various consensus nodes may record the proposal data together with collected verification signatures in a block, so that when validity verification is performed on block data of a certain consensus node, a verification result can be directly determined only according to a verification signature of the block, without the need of tracing block data corresponding to other block nodes, so that the verification of the block data is more convenient.

BRIEF DESCRIPTION OF THE DRAWINGS

The accompanying drawings, which are incorporated in and constitute a part of this specification, illustrate embodiments and, together with the description, serve to explain the principles of the specification.

FIG. 1 is a flowchart of a consensus method of a consortium blockchain according to an embodiment.

DETAILED DESCRIPTION

Figure 2:
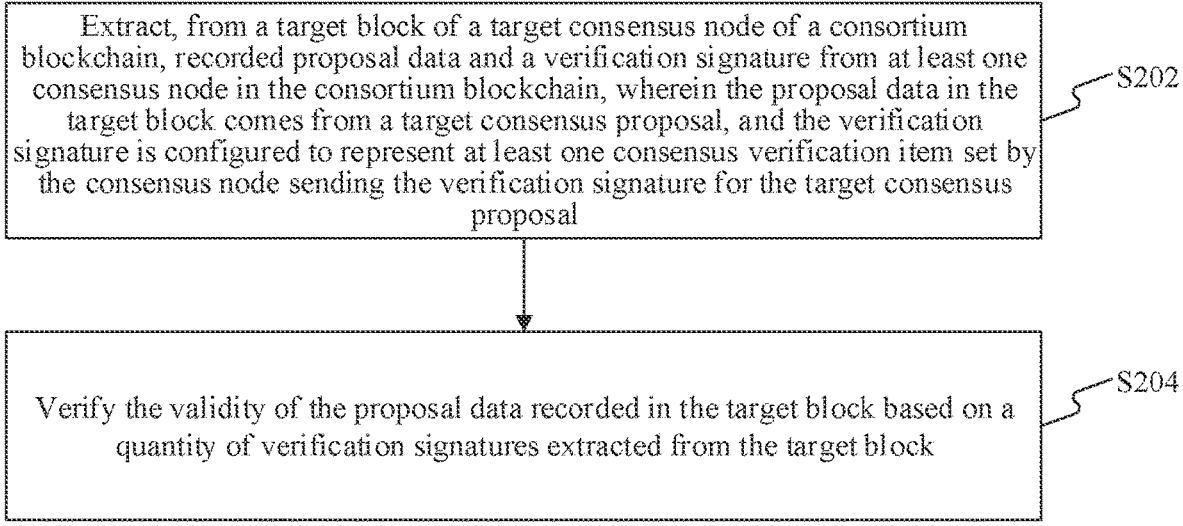
FIG. 2 is a flowchart of a data verification method of a consortium blockchain according to an embodiment.

Reference will now be made in detail to embodiments, examples of which are illustrated in the accompanying drawings. The following description refers to the accompanying drawings in which the same numbers in different drawings represent the same or similar elements unless otherwise represented. The described embodiments are merely examples of rather than all the embodiments of the present application.

As described above, at present, for a consortium blockchain, a consensus needs to be reached on data before the data can be recorded by a new block generated by each node, generally each consensus node. When authenticity of block data in a certain consensus node is verified subsequently, it is necessary to compare the block data with block data correspondingly stored by another node. This verification method is relatively cumbersome and time-consuming in data tracing, which may cause a large service delay for a consortium blockchain system with large information throughput. Therefore, the present specification provides a technical solution that can more conveniently verify data in a block.

FIG. 1 is a flowchart of a consensus method of a consortium blockchain according to an embodiment of the present specification. Referring to FIG. 1, the method may include the following steps.

In S102, when a target consensus node, e.g., a first consensus node, of a consortium blockchain performs a consensus operation on a target consensus proposal, a verification signature is sent to another consensus node, e.g., a second consensus node, of the consortium blockchain, wherein the verification signature is configured to represent at least one consensus verification item set by the consensus node sending the verification signature for the target consensus proposal.

In an embodiment, the target consensus node may be any consensus node in the consortium blockchain. For example, when a consensus protocol in the consortium blockchain classifies consensus nodes into a consensus master node and a consensus backup node, the target consensus node may be the consensus master node, or the consensus backup node.

In an embodiment, different consensus nodes in the consortium blockchain may be provided with the same verification item or at least partially different consensus verification items. For example, a consensus verification item set by at least part of the consensus nodes in the consortium blockchain may include a verification required when a consensus operation is performed on the target consensus, for example, include at least one of the following:

verification on a hash value of a local last block, which is used to ensure traceability of a new block;

verification on a timestamp of the target consensus, which is used to ensure that a timestamp of a new block is later than a timestamp of the previous block; and verification on proposal data of the target consensus, which is used to ensure that only proposal data on which a positive consensus is reached will be uploaded to the blockchain.

In an embodiment, at least part of the consensus nodes in the consortium blockchain may also set exclusive consensus verification items according to their own service requirements. For example, a consensus node of a banking institution may perform risk verification on proposal data for stored security data.

In the embodiments of the present specification, a verification signature sent by the target consensus node is representative data, and the data volume of this verification signature may be less than the data volume of an actual verification result. Accordingly, sending the verification signature at an execution stage of the target consensus may not generate a lot of data overhead.

In some embodiments, the target consensus node may perform private key encryption on some unique information (such as time of the target consensus and a view number) of the target consensus based on a preset private key encryption algorithm, so as to generate a valid verification signature for the target consensus, which can effectively deter a malicious act that another consensus node privately counterfeits the verification signature of the target consensus node.

In S104, the target consensus node receives the verification signature sent by another consensus node, e.g., at one of the second consensus node or a third consensus node, of the consortium blockchain for the target consensus proposal.

In the embodiment, other consensus nodes may send the verification signatures similar to S102 described above.

In S106, after the target consensus node reaches a consensus on proposal data of the target consensus, a block recording a collected verification signature (i.e., the received verification signature) corresponding to the consensus proposal (i.e., corresponding to the target consensus) and the proposal data is generated, wherein the verification signature recorded in the block is configured to prove the validity of the proposal data recorded in the block.

In an embodiment, a new block in step S106 can record the verification signature corresponding to the target consensus through a block header, which means that the verification signature corresponding to the target consensus may be used as digest data of the new block. In an embodiment, the new block may record the verification signature corresponding to the target consensus through a block body, which means that the verification signature corresponding to the target consensus may be used as entity data of the new block.

In an embodiment, according to a current consensus protocol mechanism, when the quantity of verification signatures in the new block reaches 2F+1 (F is a quantity of abnormal consensus nodes tolerable by the consortium blockchain), it indicates that the proposal data in the new block succeeds in verification by at least 2F+1 consensus nodes, thus having a function of proving the validity (authenticity) of the proposal data.

In the consensus method illustrated in FIG. 1, when performing a consensus operation on a target consensus, if proposal data meets a consensus verification item set by a target consensus node of a consortium blockchain for a target consensus proposal, a verification signature is sent to another consensus node. After a consensus is reached on the proposal data, various consensus nodes may record the proposal data together with collected verification signatures in a block, so that when validity verification is subsequently performed on block data of a certain consensus node, a verification result can be directly determined only according to a verification signature of the block, without the need of tracing block data corresponding to other block nodes, so that the verification of the block data is more convenient.

Corresponding to the consensus method illustrated above in FIG. 1, a data verification method of a consortium blockchain is further provided in the embodiments of the present specification. FIG. 2 is a flowchart of a data verification method according to an embodiment of the present specification. Referring to FIG. 2, the method may include the following steps.

In S202, recorded proposal data and a verification signature from at least one consensus node in a consortium blockchain are extracted from a target block of a target consensus node of the consortium blockchain, wherein the proposal data in the target block comes from a target consensus proposal, and the verification signature is configured to represent at least one consensus verification item set by the consensus node sending the verification signature for the target consensus proposal.

In S204, the validity of the proposal data recorded in the target block is verified based on a quantity of verification signatures extracted from the target block.

For example, in this step, if the quantity of the verification signatures extracted from the target block reaches 2F+1, it is determined that the proposal data recorded in the target block succeeds in the validity verification.

Based on the data verification method according to the embodiment, when block data of a certain target consensus node is verified, a verification result can be directly determined only according to a verification signature in the block, without the need of tracing corresponding block data to other consensus nodes. Therefore, the verification method has been greatly simplified, which significantly improves the verification speed and reduces the verification overhead.

In an embodiment, the data verification method is applicable to a node of a consortium blockchain system. In other words, the node in the consortium blockchain system that is provided with a data verification capability can verify data in a block based on the data verification method. In an embodiment, the data verification method is also applicable to a client, and the client verifies authenticity of data in a block based on the data verification method, for example, to realize Simplified Payment Verification (SPV).

The consensus method and the data verification method are described in detail below in combination with actual application scenarios.

In an application scenario, consensus nodes of a consortium blockchain adopt a Practical Byzantine Fault Tolerance (PBFT) protocol to implement consensus. At a commit stage of the PBFT protocol, various consensus nodes including, e.g., a consensus master node and a consensus backup node, multiplex a commit message to send verification signatures. For example, a consensus process of the PBFT protocol may include the following main steps.

The consensus master node generates proposal data of a current round of view, and the proposal data contains a transaction from a transaction pool of the consensus master node. It should be understood that in the consortium blockchain system, after receiving that a transaction is initiated by the client, the consensus master node may perform account validity verification on the transaction initiated by the client, and synchronize the transaction that succeeds in the account validity verification to its own transaction pool.

After that, based on an erasure coding technology, the consensus master node splits proposal data redundancy into a data block corresponding to the consensus backup node, and sends the split data block to the corresponding consensus backup node to ensure that transmission of the proposal data is fault-tolerant.

The consensus backup node that receives the data block sent by the consensus master node forwards the received data block to another consensus backup node in the consortium blockchain.

In an embodiment, the consensus master node initiates consensus of a current round of view, including: e.g., a pre-prepare stage, a prepare stage, and a commit stage.

Pre-Prepare Stage:

The master consensus node receives a request from a client and assigns a number to the request. After that, the consensus master node broadcasts a pre-prepare message to each consensus backup node. This pre-prepare message mainly contains a view of the current consensus and a digest of the consensus master node, and also includes hash information corresponding to each data block calculated by the consensus master node based on the erasure coding technology.

Prepare Stage:

After receiving the pre-prepare message, each consensus backup node participating in the consensus checks whether the pre-prepare message is valid.

For example, the consensus backup node may check whether the pre-prepare message is valid based on a set of verification items required to generate a verification signature. This set of verification items may include some verification items specified by the PBFT protocol itself, such as verification on the number n, verification on a consensus timestamp of this round, and verification on erasure code of prompt data. In addition, the set of verification items may also include an additional verification item that is not specified by the PBFT protocol, such as risk verification on the proposal data mentioned above.

If the pre-prepare message is valid, the procedure proceeds to the prepare stage. Then, a state of the consensus proposal on replica is determined to be prepared, and the consensus backup node adds the pre-prepare message to a local log and sends the prepare message to another consensus backup node to wait for a commit stage.

If the pre-prepare message is invalid, the consensus backup node will reject the proposal data of this consensus, and the consensus process ends.

Commit Stage:

After each of all consensus nodes enters the prepared state, it sends its own verification signature to another consensus node through a commit message, and adds the commit message sent by itself to the local log (representing its own approval).

For example, each consensus node in the consortium blockchain may encrypt some unique information (such as a view number and a consensus digest) of consensus in this round of view based on its own private key, and obtain a verification signature that has exclusive effect for this round of consensus.

When any consensus node discovers that there is a quorum agrees the number assignment, it will broadcast a commit message to all other nodes. For example, a quorum is a set of a certain quantity of replicas required to ensure all replica data consistency requirements and fault tolerance requirements. At the same time, commit messages from other nodes will be received one after another. If each node receives 2F+1 commit messages (including one of its own, these commit messages from different nodes carry the same number n and view), it indicates that the consensus node has a certificate, which may be named committed certificate, and the request reaches a committed state on this consensus node. At this time, only through this consensus node, it can be concluded that the request has reached the prepared state in a quorum, that is, all consensus nodes of the same quorum have agreed to the assignment of the number n. When the request initiated by the client reaches the committed state, it indicates that a consensus of the entire network has been reached.

After that, all consensus nodes locally generate a block that records the proposal data and the verification signatures collected based on the committed message.

Subsequently, when block data of a certain target consensus node in the consortium blockchain is verified, a corresponding process may include: extracting proposal data in the target block in the target consensus node and all verification signatures corresponding to a consensus to which the proposal data belongs.

Assuming that in this application scenario, the verification signature is data encrypted by the consensus node based on its own private key, then the corresponding verification signature is parsed based on a public key of the consensus node in the consortium blockchain to verify the authenticity of each verification signature.

If the quantity of verification signatures that succeed in the verification reaches 2F+1, it is determined that the proposal data recorded in the target block is valid.

If the quantity of verification signatures that succeed in the verification does not reach 2F+1, it is determined that the proposal data recorded in the target block is invalid. In some embodiments, an existing data verification method is implemented, and whether the proposal data recorded in the target block is valid is verified by tracing proposal data correspondingly recorded by blocks of other consensus nodes.

In the above application scenario, the consensus method according to the embodiment of the present specification multiplexes the commit message of the PBFT protocol to send the verification signature. Based on the existing PBFT protocol, when a certain consensus node enters the commit stage, it means that the consensus node has completed verification on a hash value of a local last block, verification on a timestamp of this round of consensus, and verification on the proposal data of this round of consensus. Therefore, the mechanism of commit message broadcast transmission can be used to provide its own verification signature to other consensus nodes. In this way, sending verification signatures may not increase additional signaling overhead, and therefore may not cause excessive delays to consensus and data uploading to the blockchain.

It should be understood that the above application scenario is an example. Appropriate changes can be made without departing from the above principles, and these changes should also be regarded as the protection scope of the embodiments of the present specification.

For example, the consensus method according to the embodiment of the present specification is also applicable to the HoneyBadgerBFT protocol. That is, after an Asynchronous Common Subset (ACS) stage of the HoneyBadgerBFT protocol ends (based on the HoneyBadgerBFT protocol, after the ACS stage ends, the consensus node will determine proposal data to be uploaded to the blockchain), each consensus node in the consortium blockchain sends its verification signature to another consensus node through an exclusive signature message (in the HoneyBadgerBFT protocol, the consensus node may complementally send some information through the signature message). After that, all consensus nodes locally generate a block that records the proposal data and the verification signature collected based on the signature message.

Figure 3:
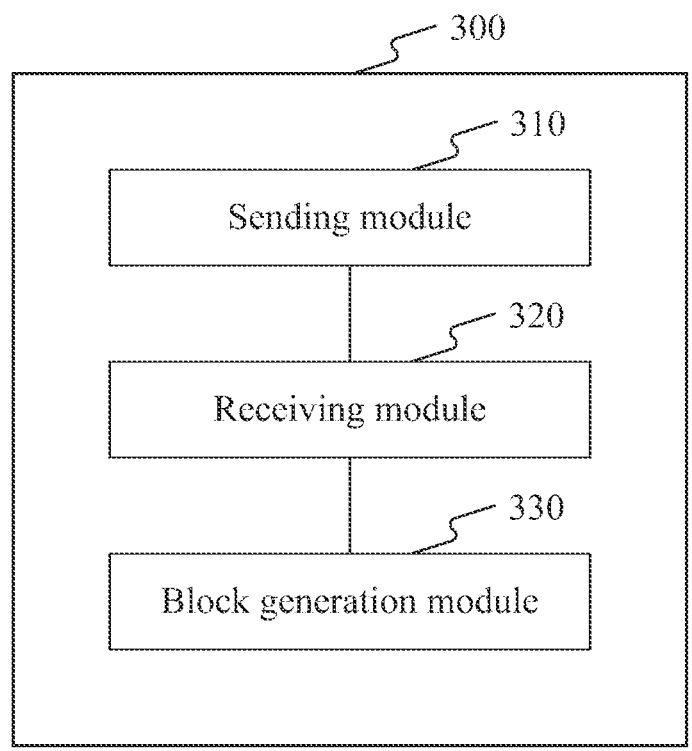
FIG. 3 is a schematic diagram of a consensus node of a consortium blockchain according to an embodiment.

Corresponding to the consensus method illustrated above in FIG. 1, a consensus node of a consortium blockchain is further provided in the embodiments of the present specification. FIG. 3 is a schematic diagram of a consensus node 300 according to an embodiment. The consensus node 300 may be implemented by a computer device, and may include a sending module 310, a receiving module 320, and a block generation module 330.

The sending module 310 is configured to, when a consensus operation is performed on a target consensus proposal, send a verification signature to another consensus node of the consortium blockchain, wherein the verification signature is configured to represent at least one consensus verification item set by the consensus node sending the verification signature for the target consensus proposal.

The receiving module 320 is configured to receive a verification signature sent by another consensus node of the consortium blockchain for the target consensus proposal.

The block generation module 330 is configured to, after a consensus is reached on proposal data of the target consensus, generate a block recording a collected verification signature corresponding to the target consensus and the proposal data, wherein the verification signature recorded in the block is configured to prove the validity of the proposal data recorded in the block.

In the embodiments of the present specification, when performing a consensus operation on a target consensus, if proposal data meets a consensus verification item set by a consensus node itself for a target consensus proposal, a verification signature is sent to another consensus node. After a consensus is reached on the proposal data, various consensus nodes may record the proposal data together with collected verification signatures in a block, so that when validity verification is performed on block data of a certain consensus node, a verification result can be directly determined only according to a verification signature of the block, without the need of tracing block data corresponding to other block nodes, so that the verification of the block data is more convenient.

In an embodiment, the consensus nodes of the consortium blockchain perform the target consensus based on a Practical Byzantine Fault Tolerance (PBFT) protocol. The sending module 310 may send a verification signature to another consensus node of the consortium blockchain through a commit message at a commit stage of the PBFT protocol.

In an embodiment, the consensus nodes of the consortium blockchain perform the target consensus based on a Honey Badger Byzantine Fault Tolerance (HoneyBadgerBFT) protocol. The sending module 310 may send a verification signature to another consensus node of the consortium blockchain based on a signature message after an ACS stage of the HoneyBadgerBFT protocol ends.

In an embodiment, different consensus nodes in the consortium blockchain are provided with the same verification item or at least partially different consensus verification items. A consensus verification item set by at least part of consensus nodes in the consortium blockchain includes at least one of: verification on a hash value of a local last block, verification on a timestamp of the target consensus, or verification on proposal data of the target consensus.

Figure 4:
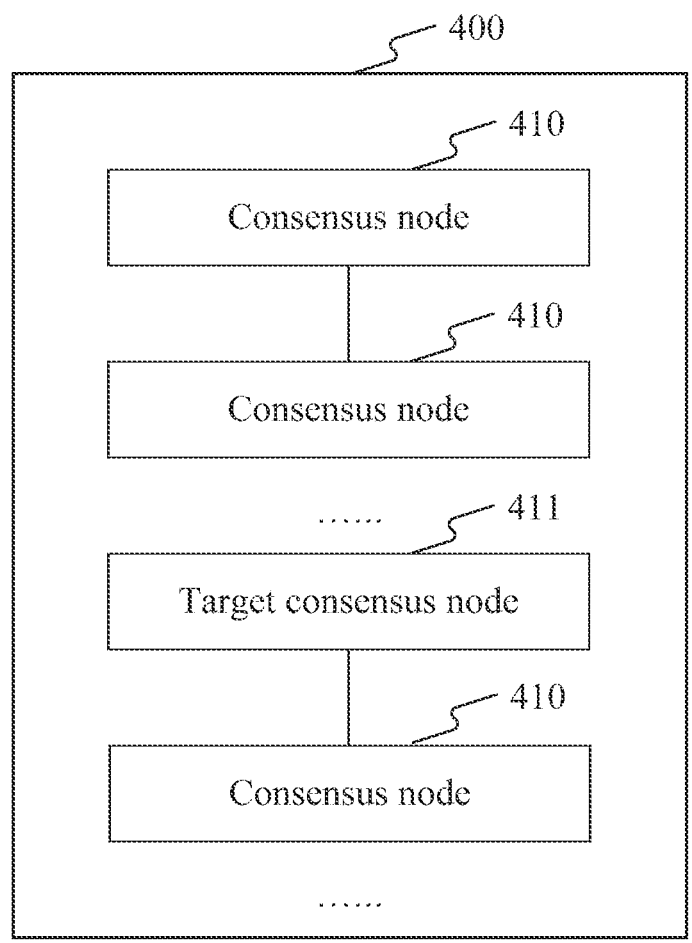
FIG. 4 is a schematic diagram of a consortium blockchain system according to an embodiment.

Corresponding to the consensus method illustrated above in FIG. 1, a consortium blockchain system is further provided in the embodiments of the present specification. FIG. 4 is a schematic diagram of a consortium blockchain system 400 according to an embodiment. The consortium blockchain system 400 may be implemented by a computer system, and may include a plurality of consensus nodes 410.

In an embodiment, a target consensus node 411 among the plurality of consensus nodes performs the following when participating in a target consensus: sending a verification signature to another consensus node of the consortium blockchain, wherein the verification signature is configured to represent at least one consensus verification item set by the consensus node sending the verification signature for the target consensus proposal; receiving a verification signature sent by another consensus node of the consortium blockchain for the target consensus proposal; and after a consensus is reached on proposal data of the target consensus, generating a block recording a collected verification signature corresponding to the target consensus and the proposal data, wherein the verification signature recorded in the block is configured to prove the validity of the proposal data recorded in the block.

In the consortium blockchain system, when performing a consensus operation on a target consensus, if proposal data meets a consensus verification item set by a target consensus node of a consortium blockchain itself for a target consensus proposal, a verification signature is sent to another consensus node. After a consensus is reached on the proposal data, various consensus nodes may record the proposal data together with collected verification signatures in a block, so that when validity verification is performed on block data of a certain consensus node, a verification result can be directly determined only according to a verification signature of the block, without the need of tracing block data corresponding to other block nodes, so that the verification of the block data is more convenient.

In an embodiment, the consensus node of the consortium blockchain performs the target consensus based on the Practical Byzantine Fault Tolerance (PBFT) protocol, wherein sending, by the target consensus node, a verification signature to another consensus node of the consortium blockchain after a consensus operation is performed on a target consensus proposal includes: sending, by the target consensus node, a verification signature to another consensus node of the consortium blockchain through a commit message at a commit stage of the PBFT protocol.

In an embodiment, the consensus node of the consortium blockchain performs the target consensus based on the Honey Badger Byzantine Fault Tolerance (HoneyBadgerBFT) protocol, wherein sending, by the target consensus node, a verification signature to another consensus node of the consortium blockchain after a consensus operation is performed on a target consensus proposal includes: sending, by the target consensus node, a verification signature to another consensus node of the consortium blockchain based on a signature message after an ACS stage of the HoneyBadgerBFT protocol ends.

In an embodiment, different consensus nodes in the consortium blockchain are provided with the same verification item or at least partially different consensus verification items. For example, a consensus verification item set by at least part of consensus nodes in the consortium blockchain includes at least one of: verification on a hash value of a local last block, verification on a timestamp of the target consensus, or verification on proposal data of the target consensus.

Figure 5:
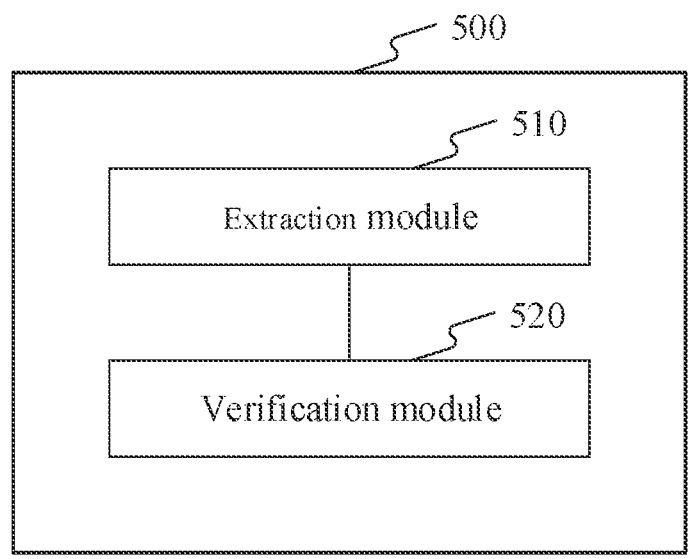
FIG. 5 is a schematic diagram of a data verification apparatus according to an embodiment.

Corresponding to the consensus method illustrated above in FIG. 2, a data verification apparatus of a consortium blockchain is further provided in the embodiments of the present specification. FIG. 5 is a schematic diagram of a data verification apparatus 500 according to an embodiment. The data verification apparatus 500 may be implemented by a computer device, and may include an extraction module 510 and a verification module 520.

The extraction module 510 is configured to extract, from a target block of a target consensus node of a consortium blockchain, recorded proposal data and a verification signature from at least one consensus node in the consortium blockchain, wherein the proposal data in the target block comes from the target consensus proposal, and the verification signature is configured to represent at least one consensus verification item set by the consensus node sending the verification signature for the target consensus proposal.

The verification module 520 is configured to verify the validity of the proposal data recorded in the target block based on a quantity of verification signatures extracted from the target block.

Based on the data verification apparatus, when block data of a certain target consensus node is verified, a verification result can be directly determined only according to a verification signature in the block, without the need of tracing corresponding block data to other consensus nodes. Therefore, the verification method has been greatly simplified, which significantly improves the verification speed and reduces the verification overhead.

In an embodiment, during execution, if the quantity of the verification signatures extracted from the target block reaches 2F+1, the verification module 520 determines that the proposal data recorded in the target block succeeds in the validity verification, wherein F is a quantity of abnormal consensus nodes tolerable by the consortium blockchain.

Figure 6:
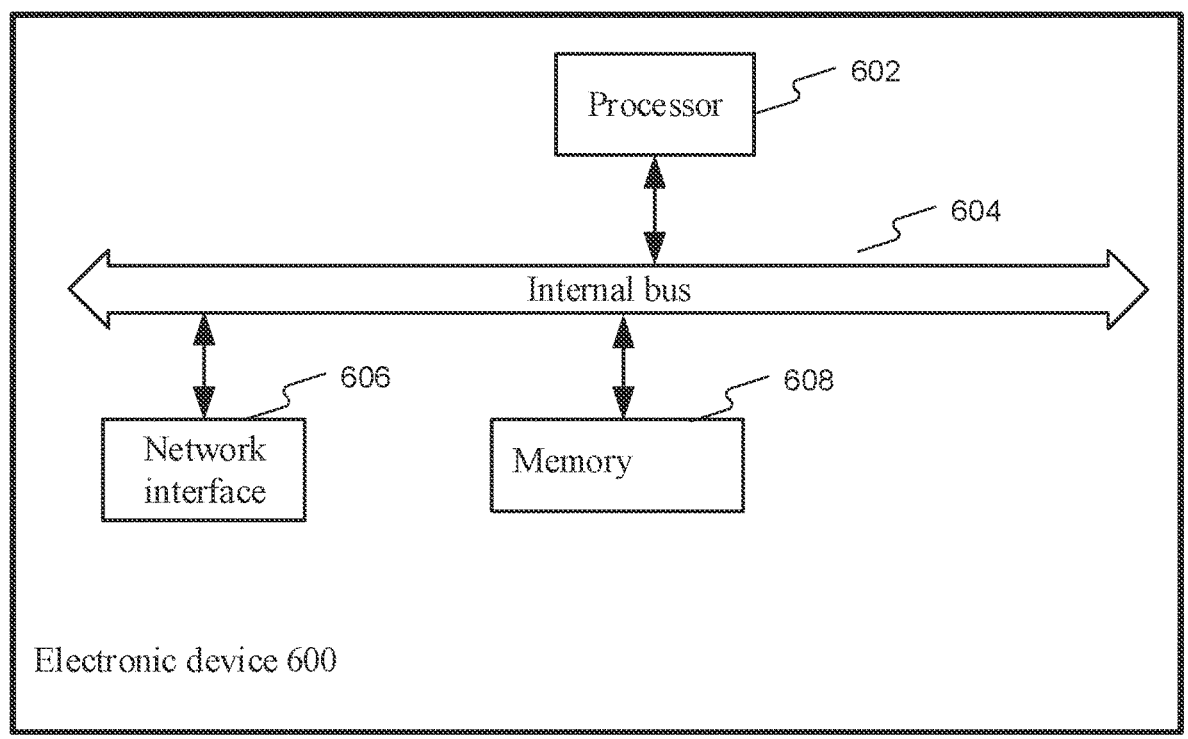
FIG. 6 is a schematic diagram of an electronic device according to an embodiment.

FIG. 6 is a schematic diagram of an electronic device 600 according to an embodiment of the present specification. Referring to FIG. 6, the electronic device 600 includes a processor 602, and may further include an internal bus 604, a network interface 606, and a memory 608. The memory 608 may include a volatile memory, such as a high-speed Random-Access Memory (RAM), and may also include a non-volatile memory, such as a magnetic disk memory. The electronic device 600 may also include hardware required by other services.

The processor 602, the network interface 606, and the memory 608 may be connected to one another through the internal bus 604. The internal bus 604 may be an Industry Standard Architecture (ISA) bus, a Peripheral Component Interconnect (PCI) bus, an Extended Industry Standard Architecture (EISA) bus, or the like. The internal bus 604 may be classified into an address bus, a data bus, a control bus, and so on. For ease of presentation, only one bidirectional arrow is used in FIG. 6, but it does not indicate that there is only one bus or one type of bus.

The memory 608 is configured to store a program, including computer instructions. The memory 608 may provide instructions and data to the processor 602.

In an embodiment, the processor 602 reads a corresponding computer program from the non-volatile memory into the volatile memory and runs the consensus node shown in FIG. 3 at a logic level. The processor 602 executes the program stored in the memory 608 and is configured to perform: when a consensus operation is performed on a target consensus proposal, sending a verification signature to another consensus node of the consortium blockchain, wherein the verification signature is configured to represent at least one consensus verification item set by the consensus node sending the verification signature for the target consensus proposal; receiving a verification signature sent by another consensus node of the consortium blockchain for the target consensus proposal; and after a consensus is reached on proposal data of the target consensus, generating a block recording a collected verification signature corresponding to the target consensus and the proposal data, wherein the verification signature recorded in the block is used to prove the validity of the proposal data recorded in the block.

In an embodiment, the processor 602 reads a corresponding computer program from the non-volatile memory into the volatile memory and runs the data verification apparatus shown in FIG. 5 at the logic level. The processor 602 executes the program stored in the memory 608 and is configured to perform: extracting, from a target block of a target consensus node of a consortium blockchain, recorded proposal data and a verification signature from at least one consensus node in the consortium blockchain, wherein the proposal data in the target block comes from the target consensus proposal, and the verification signature is used to represent at least one consensus verification item set by the consensus node sending the verification signature for the target consensus proposal; and verifying the validity of the proposal data recorded in the target block based on a quantity of verification signatures extracted from the target block.

By executing instructions stored in the memory, the processor is configured to perform the consensus method illustrated in FIG. 1 or the data verification method illustrated in FIG. 2. The processor may be an integrated circuit chip with a signal processing capability. In the implementation process, various steps of the above described methods may be completed by an integrated logic circuit of hardware in the processor or instructions in the form of software. The processor may be a general-purpose processor, including a Central Processing Unit (CPU), a Network Processor (NP), and the like, and may also be a Digital Signal Processor (DSP), an Application Specific Integrated Circuit (ASIC), a Field-Programmable Gate Array (FPGA), or other programmable logic devices, discrete gates or transistor logic devices, and discrete hardware components, to implement or perform the methods described above. The general-purpose processor may be a microprocessor, or any conventional processor or the like. The steps of the methods described above may be performed and completed by a hardware decoding processor, or performed and completed by a combination of hardware and software modules in the decoding processor. The software module may be located in a storage medium, such as a random access memory, a flash memory, a read-only memory, a programmable read-only memory, an electrically erasable programmable memory, or a register. The storage medium is located in the memory, and the processor reads information in the memory and completes the steps of the above methods in combination with its hardware.

The electronic device can realize the function of the above consensus node, or realize the function of the above data verification apparatus. In addition to the software implementation, the electronic device can also be implemented using logic devices or a combination of software and hardware. In other words, the execution body of the following processing procedure is not limited to various logic units, and may also be a hardware or logic device.

A non-transitory computer-readable storage medium is further provided in the embodiments of the present specification, and the computer-readable storage medium stores one or more programs including instructions.

In an embodiment, when the instructions are executed by a portable electronic device that includes a plurality of application programs, the portable electronic device is caused to perform the consensus method illustrated in FIG. 1. For example, the consensus method includes: when a consensus operation is performed on a target consensus proposal, sending a verification signature to another consensus node of the consortium blockchain, wherein the verification signature is configured to represent at least one consensus verification item set by the consensus node sending the verification signature for the target consensus proposal; receiving a verification signature sent by another consensus node of the consortium blockchain for the target consensus proposal; and after a consensus is reached on proposal data of the target consensus, generating a block recording a collected verification signature corresponding to the target consensus and the proposal data, wherein the verification signature recorded in the block is used to prove the validity of the proposal data recorded in the block.

In an embodiment, when the above instructions are executed by a portable electronic device that includes a plurality of application programs, the portable electronic device is caused to perform the data verification method illustrated in FIG. 2. For example, the method includes: extracting, from a target block of a target consensus node of a consortium blockchain, recorded proposal data and a verification signature from at least one consensus node in the consortium blockchain, wherein the proposal data in the target block comes from the target consensus proposal, and the verification signature is configured to represent at least one consensus verification item set by the consensus node sending the verification signature for the target consensus proposal; and verifying the validity of the proposal data recorded in the target block based on a quantity of verification signatures extracted from the target block.

Those skilled in the art should understand that the embodiments of the present specification can be provided as a method, a system, or a computer program product. Moreover, the present specification may be in the form of a computer program product implemented on one or more computer-usable storage media (including, but not limited to, a magnetic disk memory, a CD-ROM, an optical memory, and the like) including computer-usable program code.

The example embodiments of the present specification are described above. Other embodiments are within the scope of the appended claims. In some cases, the actions or steps can be performed in an order different from the orders in the embodiments and can still achieve desired results. In addition, the processes depicted in the drawings do not necessarily require the particular order shown or a sequential order to achieve the desired results. In some embodiments, multitasking and parallel processing may also be feasible or may be advantageous.

The foregoing description is merely example embodiments of the present specification, and is not used to limit the present specification. For those skilled in the art, the present specification may have various alterations and changes. Any modifications, equivalent replacements, improvements, etc. made within the spirit and principle of the present specification shall be included in the scope of the claims.

The invention claimed is:

1. A consensus method of a consortium blockchain, comprising:
   when a first consensus node of the consortium blockchain performs a consensus operation on a consensus proposal, sending a verification signature to a second consensus node of the consortium blockchain, wherein the verification signature is configured to represent at least one consensus verification item set by the first consensus node sending the verification signature for the consensus proposal;
   receiving, by the first consensus node, a verification signature sent by at least one of the second consensus node or a third consensus node of the consortium blockchain for the consensus proposal; and after the first consensus node reaches a consensus on proposal data of the consensus proposal, generating a block recording the received verification signature corresponding to the consensus proposal and the proposal data, wherein the verification signature recorded in the block is configured to prove validity of the proposal data recorded in the block.

2. The method according to claim 1, wherein the first consensus node of the consortium blockchain performs the consensus operation based on a Practical Byzantine Fault Tolerance (PBFT) protocol; and sending, by the first consensus node, the verification signature to the second consensus node of the consortium blockchain comprises:

sending, by the first consensus node, the verification signature to the second consensus node of the consortium blockchain through a commit message at a commit stage of the PBFT protocol.

3. The method according to claim 1, wherein the first consensus node of the consortium blockchain performs the consensus operation based on a Honey Badger Byzantine Fault Tolerance (HoneyBadgerBFT) protocol; and sending, by the first consensus node, the verification signature to the second consensus node of the consortium blockchain comprises:

sending, by the first consensus node, the verification signature to the second consensus node of the consortium blockchain based on a signature message after an Asynchronous Common Subset (ACS) stage of the HoneyBadgerBFT protocol ends.

4. The method according to claim 1, wherein different consensus nodes in the consortium blockchain are provided with the same verification item or at least partially different consensus verification items.

5. The method according to claim 1, wherein a consensus verification item set by at least part of consensus nodes in the consortium blockchain comprises at least one of:

verification on a hash value of a local last block, verification on a timestamp of the consensus proposal, or verification on proposal data of the consensus proposal.

6. A data verification method of a consortium blockchain, comprising:

extracting, from a block of a first consensus node of a consortium blockchain, recorded proposal data and a verification signature from at least one consensus node in the consortium blockchain, wherein the proposal data in the block is from a consensus proposal, and the verification signature is configured to represent at least one consensus verification item set by the at least one consensus node sending the verification signature for the consensus proposal; and verifying validity of the proposal data recorded in the block based on a quantity of verification signatures extracted from the block.

7. The method according to claim 6, wherein verifying the proposal data recorded in the block based on the quantity of the verification signatures extracted from the block comprises:

if the quantity of the verification signatures extracted from the block reaches 2F+1, determining that the proposal data recorded in the block succeeds in validity verification, wherein F is a quantity of abnormal consensus nodes tolerable by the consortium blockchain.

8. A first consensus node of a consortium blockchain, comprising:

a processor; and a memory storing instructions executable by the processor, wherein the processor is configured to:

when a consensus operation is performed on a consensus proposal, send a verification signature to a second consensus node of the consortium blockchain, wherein the verification signature is configured to represent at least one consensus verification item set by the first consensus node sending the verification signature for the consensus proposal;

receive a verification signature sent by at least one of the second consensus node or a third consensus node of the consortium blockchain for the consensus proposal; and after a consensus is reached on proposal data of the consensus proposal, generate a block recording the received verification signature corresponding to the consensus proposal and the proposal data, wherein the verification signature recorded in the block is configured to prove validity of the proposal data recorded in the block.

9. The first consensus node according to claim 8, wherein the first consensus node performs the consensus operation based on a Practical Byzantine Fault Tolerance (PBFT) protocol; and in sending the verification signature to the second consensus node of the consortium blockchain, the processor is further configured to:

send the verification signature to the second consensus node of the consortium blockchain through a commit message at a commit stage of the PBFT protocol.

10. The first consensus node according to claim 8, wherein the first consensus node performs the consensus operation based on a Honey Badger Byzantine Fault Tolerance (HoneyBadgerBFT) protocol; and in sending the verification signature to the second consensus node of the consortium blockchain, the processor is further configured to:

send the verification signature to the second consensus node of the consortium blockchain based on a signature message after an Asynchronous Common Subset (ACS) stage of the HoneyBadgerBFT protocol ends.

11. The first consensus node according to claim 8, wherein different consensus nodes in the consortium blockchain are provided with the same verification item or at least partially different consensus verification items.

12. The first consensus node according to claim 8, wherein a consensus verification item set by at least part of consensus nodes in the consortium blockchain comprises at least one of:

verification on a hash value of a local last block, verification on a timestamp of the consensus proposal, or verification on proposal data of the consensus proposal.

13. A data verification apparatus of a consortium blockchain, comprising:

a processor; and a memory storing instructions executable by the processor, wherein the processor is configured to perform the data verification method according to claim 6.

* * * * *